United States Patent [19]

Leeuwma et al.

[11] 4,436,110
[45] Mar. 13, 1984

[54] PRESSURE REGULATING SYSTEMS

[75] Inventors: Derk B. Leeuwma, Terschuur; Marius de Groot, Schyedam, both of Netherlands

[73] Assignee: Landi den Hartog BV, Netherlands

[21] Appl. No.: 361,752

[22] Filed: Mar. 25, 1982

[51] Int. Cl.³ ............................................ G05D 16/00
[52] U.S. Cl. ................................. 137/487.5; 251/132
[58] Field of Search ........................... 137/487.5, 486; 251/132

[56] References Cited

U.S. PATENT DOCUMENTS 3,113,582 12/1963 Hudson ........................ 137/487.5 X
3,586,027 6/1971 Fitzgerald ..................... 137/487.5 X Primary Examiner—Alan Cohan
Attorney, Agent, or Firm—Hayes, Davis & Soloway

[57] ABSTRACT

A regulating system for regulating the pressure in a fluid flow line particularly an L.P.G. supply line to the carburation system of an internal combustion engine comprises a regulating device connected in the flow line for varying the fluid flow rate along the line and an electro-fluid control loop comprising a feed-back line connected to the flow line to provide a feed-back pressure related to the pressure in the flow line and a control arrangement in which the feed-back pressure is compared with a reference pressure to provide an electrical output signal for controlling the regulating device in the sense to maintain a predetermined relationship between the feed-back pressure and the reference pressure.

The control arrangement has a pair of control chambers, each control chamber being divided into sub-chambers by a flexible diaphragm and the feed-back pressure being connected to act in one sub-chamber and the reference pressure being connected to act in the other sub-chamber. A diaphragm position sensor is associated with each control chamber and comprises an electric senser having a senser coil whose electrical output is representative of the distance of the diaphragm from it, the arrangement being such that a variation in the feed-back pressure in relation to the reference pressure causes the diaphragms to move in opposite directions relatively to their associated senser coils. Comparator means are provided for comparing the electrical outputs from the sensor coils to provide an output for controlling said regulating device.

12 Claims, 6 Drawing Figures

PRESSURE REGULATING SYSTEMS

This invention relates to a regulating system for regulating the pressure in a fluid flow line and of the kind having an electro-fluidic control loop whereby the fluid flow rate is varied in such manner that said pressure maintains a predetermined relationship with a reference pressure. Said reference pressure may be a constant pressure for example atmospheric pressure, or a varying pressure.

The regulating system of the invention has particular, but not exclusive, application in supplying L.P.G. (liquified petroleum gas) such as propane in vaporised form to the carburation systems of internal combustion engines. In such application the fluid flow line constitutes the L.P.G. fuel supply line to the carburation system and the regulating system maintains the pressure in the fuel supply line at a predetermined value by varying the rate of flow along the supply line and so effectively maintains a predetermined constant air/fuel ratio.

The object of the present invention is to provide a regulating system which is of high sensitivity and which is capable of being designed to meet the objectives of automatic temperature compensation and substantial immunity from vibration shocks.

According to the invention there is provided a regulating system for regulating the pressure in a fluid flow line comprising:

(i) a regulating device connected in said flow line for varying the fluid flow rate along said line, (ii) an electro-fluid control loop comprising
  (a) a feed back line connected to said flow line to provide a feed-back pressure related to the pressure in said flow line,
  (b) a control arrangement in which said feed back pressure is compared with a reference pressure to provide an electrical output signal for controlling the regulating device in the sense to maintain a predetermined relationship between said feed back pressure and said reference pressure, characterised in that said control arrangement comprises:

(A) a pair of control chambers, each control chamber being divided into sub-chambers by a flexible diaphragm and said feed-back pressure being connected to act in one sub-chamber and the reference pressure being connected to act in the other sub-chamber.

(B) a diaphragm position sensor associated with each control chamber and comprising an electric senser having a senser coil whose electrical output is representative of the distance of the diaphragm from it, the arrangement being such that a variation in said feed-back pressure in relation to said reference pressure causes said diaphragms to move in opposite directions relatively to their associated senser coils, and (C) comparator means for comparing the electrical outputs from said senser coils to provide any output for controlling said regulating device.

One pressure regulating system in accordance with the invention and as applied to the carburation system of an internal combustion engine supplied with LPG will now be described by way of example with reference to the accompanying diagrammatic drawings in which.

Figure 1:
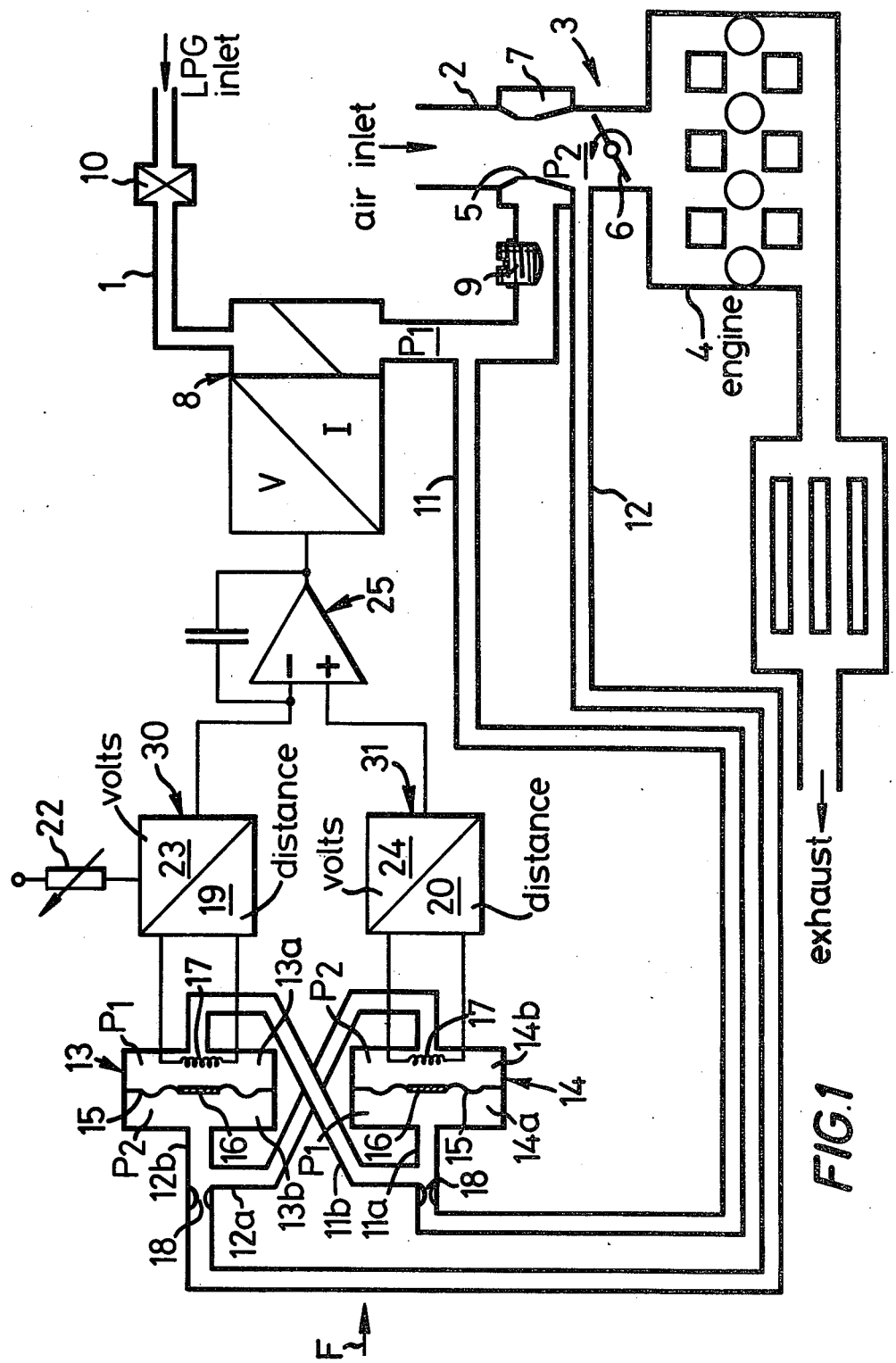
FIG. 1 shows a block diagram of the regulating system.

Referring to FIG. 1, an L.P.G. supply line 1 leads from a storage tank (not shown) into the air intake 2 of the carburation system 3 of an internal combustion engine 4. The carburation system 3 includes in conventional manner a venturi 5 and a throttle valve 6. The supply line 1 terminates in the air intake 2 in a mixing unit 7 which causes the L.P.G. to be fed into the carburation system 3 in a manner in which it becomes intimately mixed with the air flow. The mixing unit may be of known design as manufactured by the Applicants for several years. The L.P.G. supply line 1 includes a proportional flow solenoid valve 8 for regulating the flow of L.P.G. along the supply line 1 as will be described and a mixture screw 9. It also includes a pressure regulator to ensure that the source pressure of the L.P.G. is at a predetermined value.

The carburation system 3 itself will therefore operate in conventional manner. The air flowing past the venturi 5 will create a negative pressure at the outlet end of the L.P.G. supply line 1 to cause L.P.G. fuel to be drawn into the carburation system 3. The mixture screw 9 provides a constriction in the supply line, this constriction being determined by the setting of the mixture screw 9. Thus there will be a pressure differential across the mixture screw 9 which is variable by adjusting the setting of the mixture screw 9.

The regulating system in accordance with the invention operates to maintain the pressure $P_1$ on the side of the mixture screw 9 remote from the venturi 5 in a predetermined relationship with a reference pressure $P_2$. In this example the reference pressure $P_2$ is derived from the air intake 2 at a position between the venturi 5 and the throttle valve 6 and is therefore proportional to atmospheric pressure; the pressure $P_1$ is therefore maintained substantially constant by the regulating system. Alternatively and with the same effect the pressure $P_2$ could be derived from a position between the venturi and the air filter. With the regulating system operating, the pressure $P_1$ is initially set by adjustment of the regulating system as will be described with the engine 4 running at idling speed and under no-load conditions to provide a desired air/fuel ratio as determined from an analysis of the exhaust gases. Further adjustment of the air/fuel ratio can be made by adjustment of the mixture screw 9.

The pressure $P_1$ in the supply line 1 is monitored through feed-back line 11 leading from the supply line 1 to the regulating system. The reference pressure $P_2$ is monitored through feed-back line 12 leading from the air intake 2 to the regulating system.

The regulating system has a control arrangement comprising two control chambers 13 and 14 which are of identical construction. The control chambers are divided into sub-chambers 13a, 13b and 14a, 14b by respective flexible diaphragms 15 whose elastic rate is substantially constant so that their deflection from a rest position is proportional to the differential pressure across them. The control arrangement also has a respective diaphragm position senser associated with each of the control chambers. Each diaphragm position senser comprises a metal washer or slug 16 carried by the associated diaphragm 15 and a senser coil 17 which senses the distance of the associated slug 16 from it. The senser coils have identical characteristics. Alternatively the diaphragm 15 itself could be made of metal so that the washer or slug 16 is not necessary.

The feed back lines 11 and 12 connect with the control chambers 13 and 14 and at a position adjacent the control chambers 13 and 14 each contains a damping jet 18. Between the damping jets 18 and the control chambers 13 and 14 each feed-back line branches into two lines referenced 11a and 11b in the case of feed-back line 11 and 12a and 12b in the case of feed back line 12. The branch 11a of feed-back line 11 leads into sub-chamber 14a of control chamber 14 and the branch 11b leads into sub-chamber 13b of control chamber 13. The branch 12a of the feed-back line 12 leads into sub-chamber 13a of control chamber 13 and the branch 12b leads into the sub-chamber 14b of the control chamber 14. Thus the pressure $P_1$ acts on the side of the diaphragm 15 adjacent the senser coil 17 in control chamber 13 and on the side of the diaphragm 15 remote from the senser coil 17 in the other control chamber. Similarly the pressure $P_2$ acts on the side of the diaphragm remote from the senser coil 17 in the control chamber 13 and on the side of the diaphragm 15 adjacent the senser coil 17 in the control chamber 14. The effect of this is that if the pressure $P_1$ varies in relation to the pressure $P_2$ the diaphragms 15 and hence the slugs 16 carried by the diaphragms 15 will move in opposite directions with respect to their associated senser coils 17.

Figure 2:
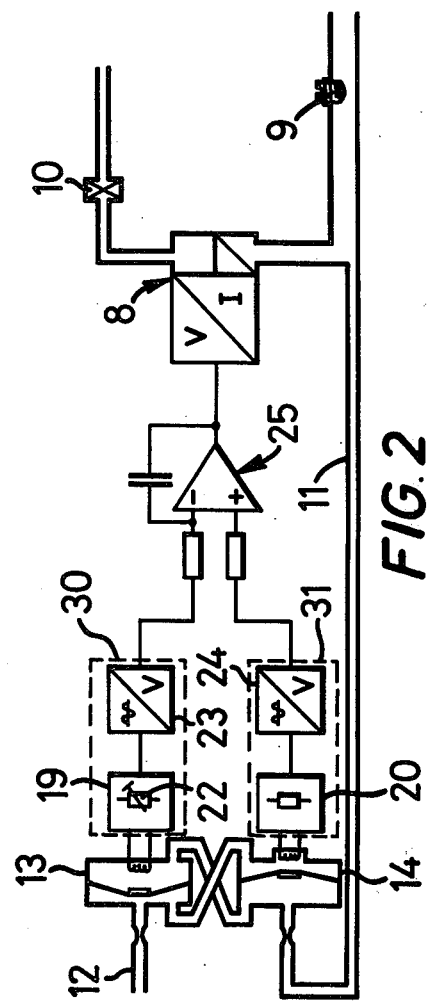
FIG. 2 is a block circuit diagram of the system of FIG. 1 showing a part of the circuit of FIG. 1 in greater detail.
Figure 3:
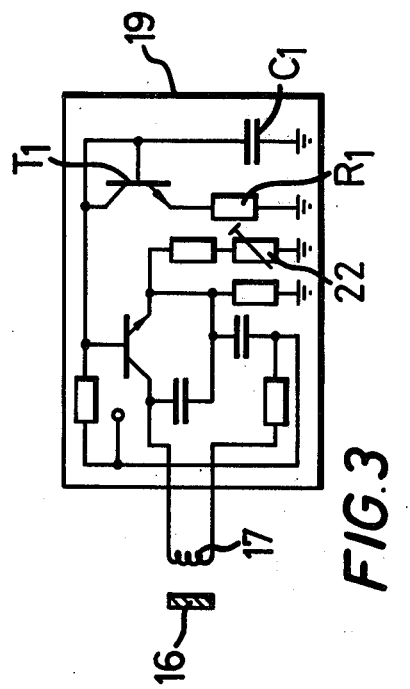
FIG. 3 shows one form of oscillator circuit which can be used in the regulating system.

The outputs from the senser coils which outputs are representative of the distances of the slugs 16 from the senser coils are fed to distance to voltage converters 30 and 31. In more detail as shown in FIG. 2 the senser coils 17 form inductance coils in respective high frequency oscillators 19 and 20 which have identical characteristics. The inductance of each senser coil 17 varies with variation in the distance of associated slug 16 from it to cause a variation in the osciallation amplitude. One or both osciallators 19 and 20 also incorporate a potentiometer, as indicated at 22 for the oscillator 19 in FIG. 2 for adjusting the amplitude of oscillation. The oscillators may be of conventional design. One circuit configuration of a suitable oscillator is shown in FIG. 3. The transistor $T_1$ and associated capacitor $C_1$ and resistor $R_1$ provide a temperature compensation in that they are subject to the same temperature conditions as the actual oscillator circuit and provide a varying bias on the oscillator output which is opposite to the effect of any temperature change to which the oscillator is subjected.

The effect of varying the distance of the slug 16 from the senser coil 17 on the amplitude of the output of the oscillator is shown in FIG. 4(a) by the representation of the wave form. In FIG. 4(b) it is shown how the setting of the potentiometer 22 can be varied to produce the equal and opposite effect so that as illustrated in FIG. 4(c) the two variations can, if desired be combined to maintain the amplitude constant. This indicates the flexibility of the system in adjusting the output amplitude of the oscillator for any given distance of the slug 16 from its associated senser coil 17.

The outputs from oscillators 19 and 20 are fed to detectors 23 and 24 respectively which produce voltage outputs proportional to the amplitudes of the output waveforms of the associated oscillators 19 and 20. The voltage outputs from the detectors 23 and 24 are fed as respective inputs to comparator 25 which is in the form of a differential amplifier and has an integrating function. The input from detector 24 is shown as the "positive" input and the input from the detector 23 is shown as the "negative" input. In conventional manner, as long as the "positive" input is more positive than the "negative" input the output from the comparator will be an increasing voltage output of high gain. If the "negative" input becomes more positive than the "positive" input then the voltage output from the comparator will decrease.

The voltage output of the comparator 25 is fed to the proportional flow solenoid valve 8 which in effect is a voltage/current convertor. Hence the energisation of the solenoid coil will be proportional to the voltage output from the comparator 25 to cause a predetermined opening of the valve 8 and hence a predetermined rate of flow of fuel along the fuel supply line 1.

The regulating system, as will be readily appreciated from the ensuing description of its operation, forms a closed electro-fluidic loop which is dynamically stable, to maintain the pressure $P_1$ at a predetermined constant value for any given setting of the regulating system.

In operation of the regulating system, assuming a given engine demand, as determined by the setting of the throttle 6 and engine speed, the pressure $P_1$ will be fed back to the control chambers 13 and 14 and compared with the pressure $P_2$ to produce voltage outputs which will cause the comparator 25 to integrate up or down depending whether $P_1 < P_2$ or $P_1 > P_2$. This will cause the valve 8 to open or close by a certain amount to vary the flow of fuel along the line 1 in the sense to equalise the pressure $P_1$ to pressure $P_2$. This new instantaneous value of $P_1$ will be fed back and the operation repeated. Hence the diaphragms 15 will oscillate about a mean position. However due to the high gain of the electro-fluidic loop the amplitude of this oscillation will be very small, and the pressure $P_1$ will remain sensibly constant.

If now the engine demand increases this will cause a significant instantaneous variation in the pressure $P_1$ and the electro-fluidic loop will become temporarily unstable. Assume for example that the engine demand increases then the pressure $P_1$ will instantaneously decrease, i.e. become more negative since the venturi pressure will become more negative. Through the resultant displacement of the diaphragms this will cause the "positive" input of the comparator to be greater than the "negative" input. The output from the comparator will thus up integrate to cause opening of the valve 8 to increase the fuel flow along line 1 and so increase the pressure $P_1$ until it is equal to $P_2$. The electro-fluidic loop will then settle into a stable dynamic state again as described above.

Figure 4:
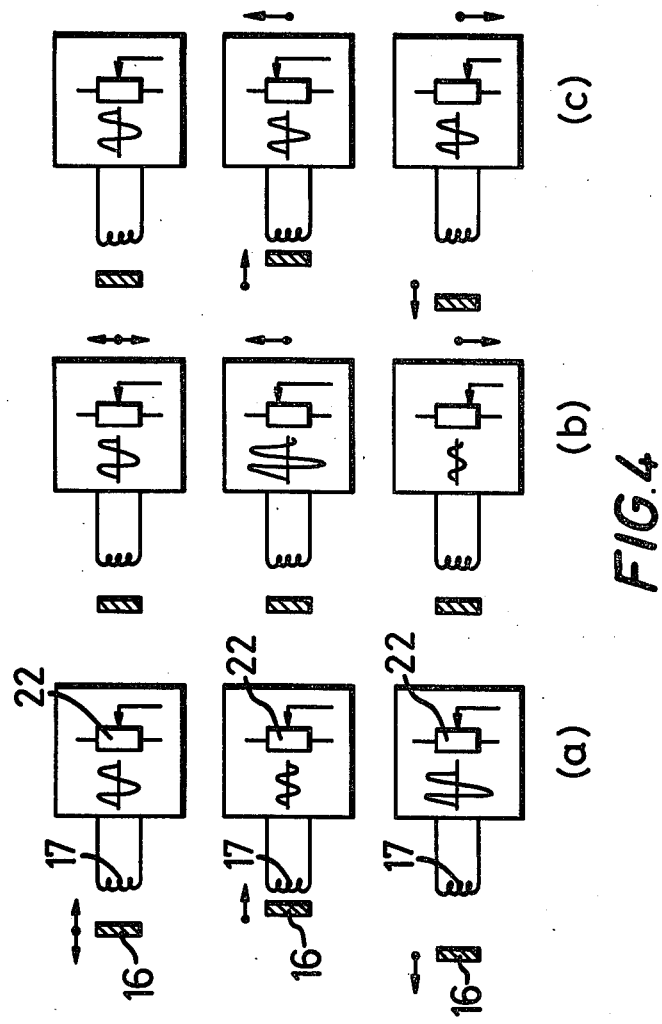
FIG. 4 shows at (a) to (c) the effect of a difference existing between the pressure $P_1$ being regulated and the reference pressure $P_2$ in the control chambers under different control conditions.

The potentiometer 22 provides a fine adjustment of the regulating system to vary the air/fuel ratio in that its adjustment sets $P_1$ to a new value. If the potentiometer 22 is adjusted, its effect on the electro-fluidic loop as can be appreciated from FIG. 4 is the same as if the pressure $P_1$ has instantaneously changed in response to a change in engine demand. Hence adjustment of the potentiometer 22 will vary the output amplitude of the oscillator 19 and the loop will become temporarily unstable. This will cause adjustment of the setting of the solenoid valve 8 to vary the fuel flow rate along the supply line 1 and so vary the value of pressure $P_1$ in the sense to equalise it with pressure $P_2$ until the output amplitudes of the oscillators 20 and 19 are equal. The system will then settle down into a stable dynamic state with the new value of $P_1$ which will differ from the previous value $P_1$ by an amount which is proportional to the change in oscillator amplitude initially caused by the adjustment of the potentiometer 22. It will be appreciated that in this new stable state the diaphragms will have a different mean position from previously.

A regulating system as described above could be modified to have a single control chamber. However the system as described above has certain advantages over a system using only one control chamber. One advantage is that it provides a completely closed loop. If a single control chamber was used the "negative" input to the comparator 25 would have to be provided from an arbitrary source which could create difficulties. Another advantage is that it is twice as sensitive since the difference created between the "positive" and "negative" inputs on the comparator 25 for an instantaneous change in pressure $P_1$ is twice as great as with a single control chamber where the "negative" input is a constant value.

Another advantage in using two control chambers is that the regulating system is automatically temperature compensated for the following reason. The two sensor coils have identical characteristics so that they provide the same impedance value in the oscillator circuits of which they form part. Any change in impedance of the two sensor coils brought about by a change in ambient temperature will cause the same change of impedance of the two coils. Hence the amplitudes of the outputs of the associated oscillator circuits will be changed by the same amounts so that there will be no change in the difference between the "positive" and "negative" inputs to the comparator 25.

Another advantage of the regulating system as described above is that it can be designed so that it has substantial immunity from vibration shocks and this advantage again arises from the use of two control chambers. To provide this advantage the physical design of the control arrangement has to be such that in space the control chambers 13 and 14 are arranged so that they are subjected to the same shocks and the senser coils 17 are on the same side of the diaphragms 15 for example as shown in FIG. 1. This can be realised by combining the control chambers into a single casing. If a mechanical shock is then applied as indicated by arrow F in FIG. 1, the damper jets 18 will prevent any significant change in pressures $P_1$ and $P_2$ in the two chambers but chamber casings will move to the right as seen in FIG. 1 relative to the diaphragms 15. However the change in distance between the slugs 16 and their associated senser coils 17 will be the same so that the output amplitudes of the oscillators 19 and 20 will change by the same amount so that the operation of the regulating system is not affected.

If desired a feedback loop can be provided from the exhaust emission using an oxygen sensor to determine whether or not the mixture is too rich or too lean. This feedback can be arranged to have the same effect on the regulating system as automatically adjusting the mixture screw 9 to vary the relationship between the pressures $P_1$ and $P_2$.

As an alternative to the integrating comparator a microprocessor could be used. In this case the load condition of the engine can be calculated and used to correct the venturi signal by changing the difference between the reference and controlled pressures $P_1$ and $P_2$.

We claim:

1. A regulating system for regulating the pressure in a fluid flow line comprising:
   (i) a regulating device connected in said flow line for varying the fluid flow rate along said line,
   (ii) an electro-fluid control loop comprising
      (a) a feed back line connected to said flow line to provide a feed-back pressure related to to the pressure in said flow line,
      (b) a control arrangement in which said feed back pressure is compared with a reference pressure to provide an electrical output signal for controlling the regulating device in the sense to maintain a predetermined relationship between said feed back pressure and said reference pressure,
   characterised in that said control arrangement comprises:
      (A) a pair of control chambers, each control chamber being divided into sub-chambers by a flexible diaphragm and said feed-back pressure being connected to act in one sub-chamber and the reference pressure being connected to act in the other sub-chamber,
      (B) a diaphragm position sensor associated with each control chamber and comprising an electric sensor having a sensor coil whose electrical output is representative of the distance of the diaphragm from it, the arrangement being such that a variation in said feed-back pressure in relation to said reference pressure causes said diaphragms to move in opposite directions relatively to their associated senser coils, and
      (C) comparator means for comparing the electrical outputs from said senser coils to provide an output for controlling said regulating device.

2. A regulating system according to claim 1, wherein said feed-back pressure and said reference pressure connect with the control chambers through fluid lines containing damping jets.

3. A regulating system according to claim 2, wherein said control chambers are so arranged that any relative movement between the diaphragms and their associated sensor coils caused by physical shock applied to them simultaneously is in the same direction.

4. A regulating system according to claim 1, 2 or 3 wherein said senser coils form inductance coils in respective oscillator circuits, the inductance of said senser coils varying with variation in the distance of the associated diaphragms from them to vary the oscillation amplitude of said oscillator circuits.

5. A regulating system according to claim 4, wherein at least one of said oscillator circuits is adjustable from an external control to vary its oscillation amplitude.

6. A regulating system according to claim 5, wherein the output from each said oscillator circuit is fed to a respective detector which produces an output voltage representative of the oscillation amplitude.

7. A regulating system according to claim 6, wherein the voltage outputs from said detectors provide respective inputs to said comparator means.

8. A regulating system according to claim 7, wherein said comparator means has an integrating function.

9. A regulating system according to claim 5, wherein said oscillator circuits have identical characteristics whereby changes in ambient temperature have no resultant effect on the regulating system.

10. A regulating system according to claim 6, wherein said oscillator circuits have identical characteristics whereby changes in ambient temperature have no resultant effect on the regulating system.

11. A regulating system according to claim 7, wherein said oscillator circuits have identical characteristics whereby changes in ambient temperature have no resultant effect on the regulating system.

12. A regulating system according to claim 8, wherein said oscillator circuits have identical characteristics whereby changes in ambient temperature have no resultant effect on the regulating system.

* * * * *